United States Patent [19]

Davis

[11] 4,298,330
[45] Nov. 3, 1981

[54] CURVED MANDREL FOR CURING POLYMERIC HOSE AND METHOD

[75] Inventor: Richard F. Davis, Waynesville, N.C.
[73] Assignee: Dayco Corporation, Dayton, Ohio
[21] Appl. No.: 86,984
[22] Filed: Oct. 22, 1979
[51] Int. Cl.³ .............................................. B29H 5/18
[52] U.S. Cl. ................................... 425/392; 264/313; 425/403; 425/DIG. 12; 425/DIG. 14
[58] Field of Search ....... 425/392, DIG. 12, DIG. 14, 425/403, 393; 264/313

[56] References Cited
U.S. PATENT DOCUMENTS

| | | | |
|---|---|---|---|
| 1,801,346 | 4/1931 | Heath | 425/DIG. 14 |
| 2,970,343 | 2/1961 | Johnson | 425/DIG. 14 |
| 4,015,918 | 4/1977 | McPhee | 425/403 |
| 4,030,871 | 6/1977 | Cobb | 425/403 |
| 4,052,498 | 10/1977 | Buron | 425/DIG. 14 |
| 4,197,079 | 4/1980 | Patzner | 425/403 |

*Primary Examiner*—James H. Derrington
*Attorney, Agent, or Firm*—Charles E. Bricker

[57] ABSTRACT

A curved mandrel, method of making same, and method of curing an uncured polymeric hose employing such curved mandrel are provided and the curved mandrel comprises a plurality of members disposed in end-to-end relation to define the configuration of the mandrel including a predetermined curvature therein, interlocking portions for interlocking the members in only one position to define the configuration and curvature, and a readily attachable and detachable device for holding the members axially against each other after interlocking wherein the members with the interlocking portions and holding device are adapted to provide a substantially straight mandrel for installation of an uncured straight hose therearound, define the configuration and curvature in the mandrel and uncured hose, and provide looseness and axial spacing between members to enable easy withdrawal of the cured curved hose from around the members.

15 Claims, 16 Drawing Figures

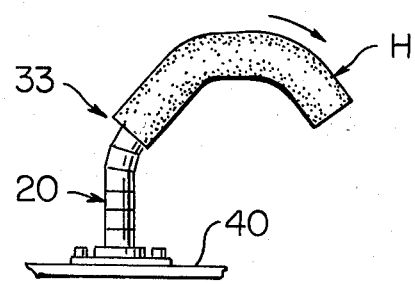
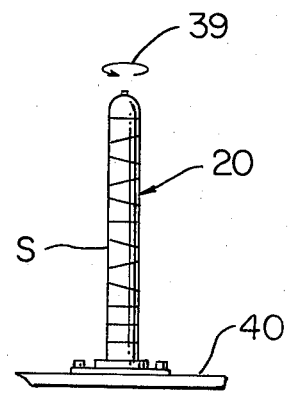
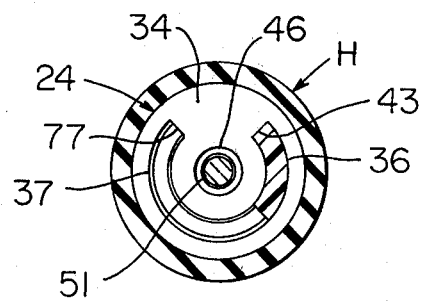
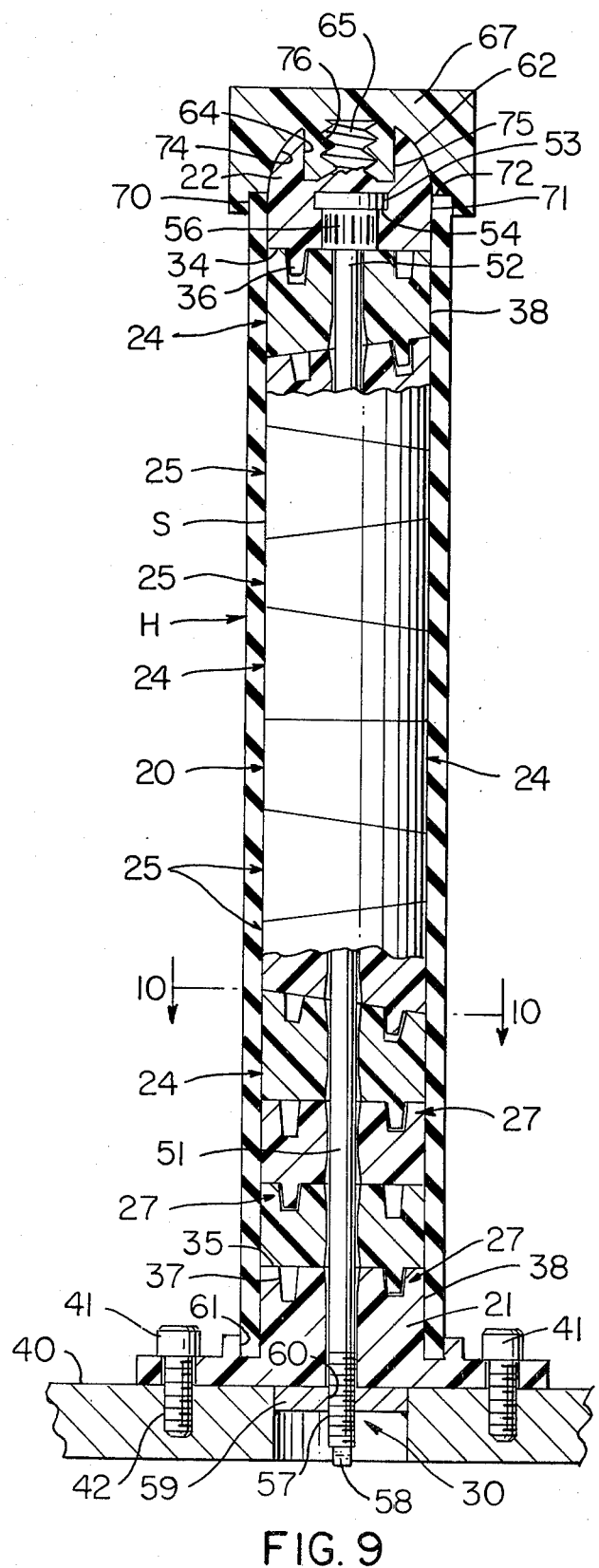

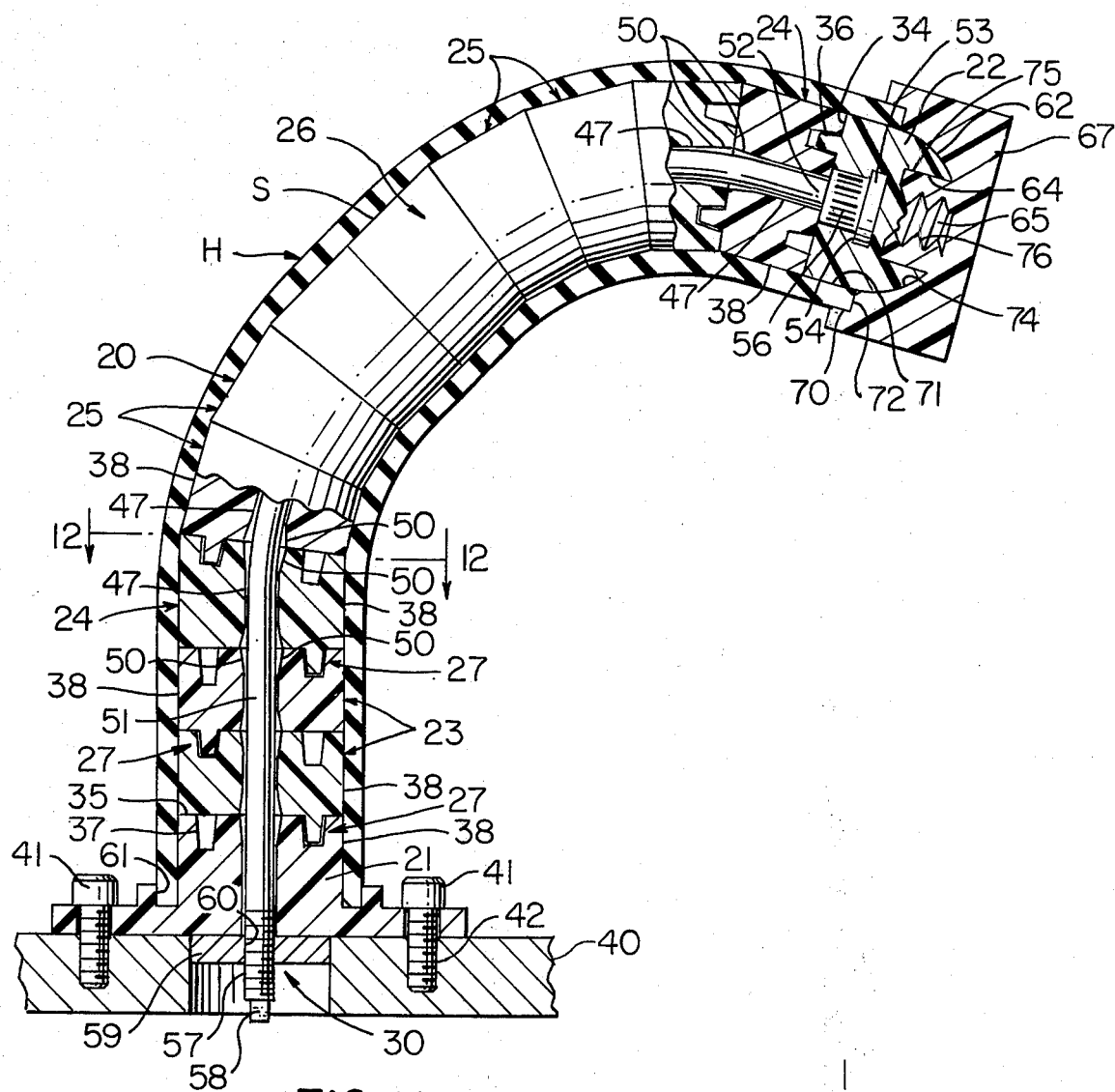
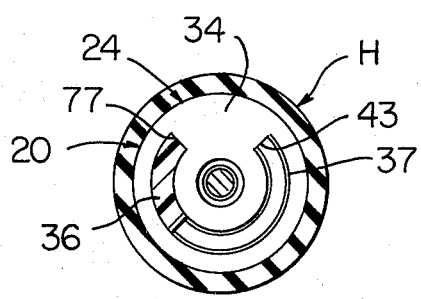
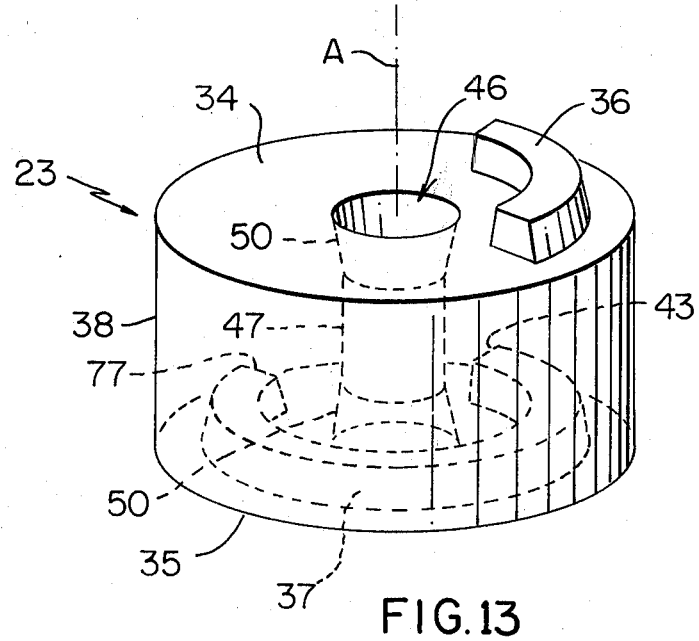
FIG. 11
FIG. 12
FIG. 13

CURVED MANDREL FOR CURING POLYMERIC HOSE AND METHOD

BACKGROUND OF THE INVENTION

1. Field of the Invention

This invention relates to a curved mandrel, method of making same, and method of curing an uncured polymeric hose on such curved mandrel.

2. Prior Art Statement

Hoses made primarily of polymeric material are widely used for containing and conveying fluids of all types; and, in many applications, such as, automobiles, trucks, buses, aircraft, locomotives, and watercraft it is necessary to provide such hoses with preformed non-rectilinear configurations including curves in one or more planes.

It is known in the art to provide curved polymeric hoses by supporting uncured polymeric hose constructions on rigid substantially non-yielding mandrels during curing in order to provide hoses having precise configurations and non-collapsed flow areas throughout their lengths. An example of a curved rigid mandrel is presented in U.S. Pat. No. 4,015,918.

However, in producing a curved hose on a rigid curved mandrel it is usually very difficult and time-consuming to install the hose before curing and remove such hose after curing. In addition, the removal of the cured hose often results in damage to the hose and/or mandrel and the hose damage often requires scrapping of the entire cured hose. These considerations of time required to handle a hose in processing same on a rigid curved mandrel and damage to the hose and/or mandrel during removal result in excessive costs in producing a curved hose.

SUMMARY

It is a feature of this invention to provide an improved curved mandrel for supporting an uncured polymeric hose during curing to define a corresponding curved configuration in the cured hose wherein the mandrel and its use enables production of curved cured hose at minimum cost.

Another feature of this invention is to provide a curved mandrel of the character mentioned wherein such mandrel provides rigid non-yielding support of an uncured polymeric hose during curing.

Another feature of this invention is to provide a curved mandrel of the character mentioned comprising a plurality of members disposed in end-to-end relation to define the configuration of the mandrel including predetermined curve means therein with means interlocking the members in only one position to define the configuration and curve means and readily attachable and detachable holding means for holding the members axially against each other after interlocking thereof. The members with the interlocking means and holding means are adapted to, provide a substantially straight mandrel for easy installation of an uncured straight hose therearound, define the configuration and curve means in the mandrel and uncured hose, and provide looseness and axial spacing between members to enable easy withdrawal of the cured curved hose from around the members.

Another feature of this invention is to provide an improved method of making a curved mandrel of the character mentioned.

Another feature of this invention is to provide an improved method of curing an uncured polymeric hose on a curved mandrel of the character mentioned.

Therefore, it is an object of this invention to provide an improved curved mandrel, method of making same, and method of curing an uncured polymeric hose employing such mandrel having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIGS. 2–7 illustrate a series of steps which may be employed to enable curing an uncured polymeric hose to define the hose illustrated in FIG. 1;

FIG. 8 is a view illustrating the manner in which the mandrel is restored to its original straight or rectilinear configuration in preparation for placing a straight length of uncured polymeric hose thereon in the manner illustrated in FIGS. 2 and 3;

FIG. 9 is an enlarged view of the mandrel of this invention with an uncured hose therearound illustrating certain parts in cross-section, other parts in elevation, and still other parts broken away and particularly showing details of the various members of the mandrel with such mandrel and hose being essentially in the position of FIG. 3 and prior to defining a predetermined final configuration of the mandrel in the manner illustrated in FIG. 4;

FIG. 10 is a cross-sectional view taken essentially on the line 10—10 of FIG. 9;

FIG. 11 is a view similar to FIG. 9 illustrating the mandrel and hose in the position shown in FIG. 4;

FIG. 12 is a cross-sectional view taken essentially on the line 12—12 of FIG. 11;

FIGS. 13, 14, and 15 illustrate three different types of mandrel members which comprise the exemplary mandrel of FIGS. 2–12.

DETAILED DESCRIPTION

Figure 1:
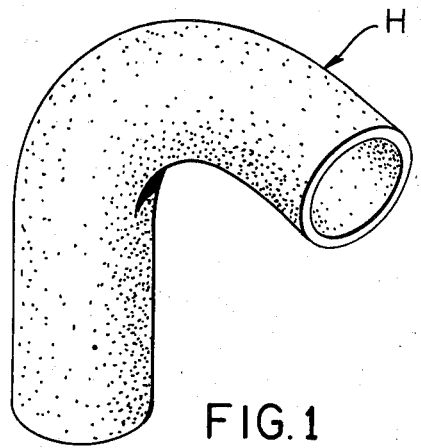
FIG. 1 is a perspective view illustrating one exemplary embodiment of a cured curved hose made employing the mandrel of this invention.

Reference is now made to FIGS. 2–12 of the drawings which illustrate one exemplary embodiment of a mandrel of this invention and such mandrel is designated generally by the reference numeral 20 and is provided for supporting an uncured polymeric hose thereon for curing purposes. For simplicity and ease of presentation such hose is designated by the reference letter H in the various FIGS. of the drawings regardless of whether such hose is shown in an uncured straight configuration, uncured curved configuration, or curved cured configuration.

The mandrel 20 provides a rigid substantially non-yielding supporting surface S throughout its entire surface area during curing of the construction. The arrangement of such mandrel is such that once a hose H is cured thereon the cured hose H may be removed in an efficient manner without damage to the cured hose itself and without damage to the mandrel 20 and its component portions. The provision of a rigid nonyielding mandrel assures the cured curved hose H has a precise configuration and a non-collapsed flow area throughout its length.

The mandrel 20 comprises a plurality of cooperating components or members (FIGS. 9 and 11) including a member which will be referred to as a base member 21 at one end thereof, a nose member 22 at its opposite end, and a plurality of three types of members disposed between the base member 21 and the nose member 22 and such three types will be designated generally by the reference numerals 23, 24, and 25 with only a few representative ones of such members being thus designated.

The members 21, 22, 23, 24, and 25 are disposed in end-to-end relation and basically define the overall configuration of the mandrel including predetermined curve means therein; and, in this example of the invention, the curve means is a single planar curve provided in such mandrel and designated by the reference numeral 26. This reference to curve 26 being a single planar curve indicates that the central axis of the curved mandrel 26 and hose 20 is disposed in a single plane.

The mandrel 20 also has means 27 interlocking the members 21-25 thereof in only one position to define the basic configuration of the hose H and the curve 26 therein and also has readily attachable and detachable means 30 holding the members 21-25 axially against each other after interlocking thereof. The members 21-25 with their interlocking means 27 and holding means 30 are adapted to provide a substantially straight mandrel as shown at 32 in FIG. 2 for easy installation of an uncured straight hose H therearound. The members 21-25 with their interlocking means 27 and holding means 30 are also adapted to define the configuration of the mandrel including the curve 26 therein as shown in FIG. 11; and, such members together with their interlocking means and holding means are also adapted to provide looseness and axial spacing between the members to enable easy withdrawing of the cured hose from around the members as shown at 33 in FIG. 7 for example.

The members 23-25 are basically cylindrical members (FIGS. 13-15) each having opposed end faces and for simplicity and ease of presentation, the corresponding end faces (as viewed with the members 23-25 assembled in the mandrel 20) of each of these members will be designated by the same reference numerals 34 and 35. The faces 34 and 35 are basically planar faces and the face 34 of each member has a projection 36 extending outwardly therefrom while the face 35 of each member has a recess 37 provided therein. The base member 21 also has a planar end face 35 provided with a recess 37 and the nose member 22 has a planar face 34 provided with a projection 36. Each member 21-25 has either all or the major part of its side wall defined as a cylindrical side wall 38.

As previously indicated, the mandrel has means 27 interlocking member 21-25 in only one position to define the configuration of the mandrel 20 including the curve 26 therein. The interlocking means 27 is comprised of a cooperating recess 37 and a projection 36 in adjoining faces 35 and 34 respectively in each adjoining pair of members whereby the cooperating projections and recesses of all members 21-25 define the interlocking means.

Each recess 37 and each projection 36 comprising each cooperating pair of these member portions or components is disposed or provided with respect to its end face to provide interlocking of its associated members in only one position whereby all members 21-25 are interlocked in only one position as previously mentioned. This one position is predetermined for each particular curved mandrel 20 which is to define a particular curved hose. In addition, the number of mandrel members, their location along the mandrel, and the detailed locations of the projections and recesses in each are all predetermined so that with the members 22-25 rotated counter-clockwise (indicated by arrow 39 in FIG. 8) as far as they will go the mandrel 20 assumes the straight configuration shown in this FIG.

The mandrel 20 of this example is made of thirteen members which have been constructed to enable precise shaping and curing of the hose H of FIG. 1. In particular, in the build up of the mandrel 20 the first member is base member 21 which is detachably fastened to a support plate 40 by suitable fastening means such as threaded bolts 41. The bolts extend through openings in a flange portion of member 21 and are threadedly received within threaded openings 42 in the plate 40. The second and third members outwardly of the base member 21 consist of two members 23, the fourth member is a member 24, the fifth and sixth members consist of two members 25, the seventh and eighth members consist of two members 24, the ninth through eleventh members consist of three members 25, the twelfth member is another member 24, and finally the thirteenth member is the mandrel nose member 22.

The recess 36 and projection 37 of each cooperating pair extends along its face in a circular arc having a particular radius to thereby facilitate movement of each projection within its recess. The radius of each arc extends from the central axis A of its member. With this construction each adjoining pair of members is basically relatively rotatable about a central longitudinal axis common to the pair of members. Each arcuate recess has an end wall, shown typically as an end wall 43 in the exemplary member 23 of FIG. 13, which defines a stop and determines the limiting position for an adjoining member disposed outwardly thereof. This limiting position in cooperation with similar positions of the other mandrel members defines the previously mentioned one position or sole position which determines the configuration of the mandrel.

Figure 14:
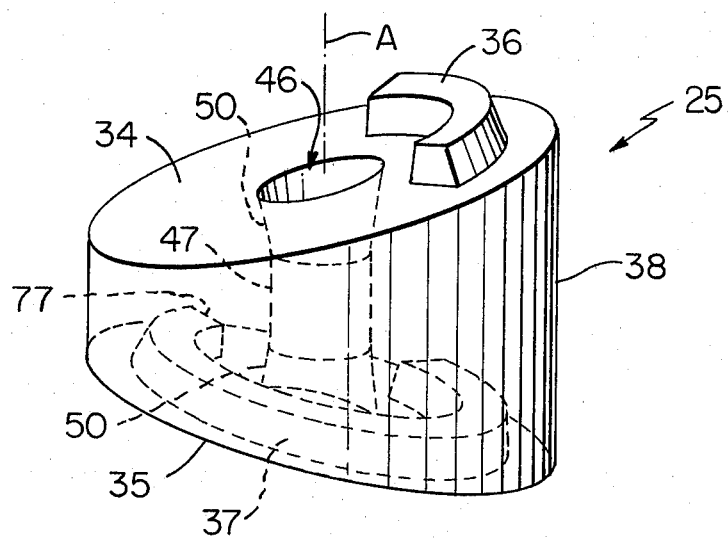
Figure 15:
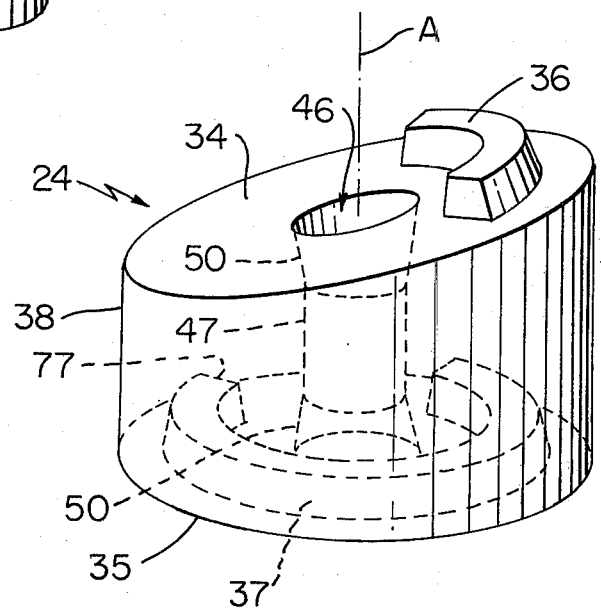

The members which comprise the main portion of the mandrel are of three basic types designated by the reference numerals 23, 24, and 25; and, these three types are illustrated in FIGS. 13, 14, and 15 respectively.

The member 23 is illustrated best in FIG. 13 and has its end faces 34 and 35 disposed in parallel relation. Preferably the end faces 34 and 35 are disposed perpendicular to the central longitudinal axis A of member 23.

The member 24 is illustrated best in FIG. 15 and has its end faces 34 and 35 disposed in nonparallel relation. One of the end faces, shown as end face 35, is disposed perpendicular to the central longitudinal axis A of the member 24 while the other end face 34 is disposed at an angle other than 90° to the axis A.

The member 25 is illustrated best in FIG. 14 and also has its end faces disposed in nonparallel relation. The end faces 34 and 35 of member 25 are disposed at an angle other than 90° to the central longitudinal axis A of such member.

To facilitate the utilization of the previously mentioned holding means 30 for holding the members axially against each other after interlocking thereof by the interlocking means 27, it is seen that each of the members 21 and 23–25 has a substantially central opening extending therethrough for receiving a portion of the holding means 30. Each central opening through each member 23, 24, and 25 will be designated generally by the reference numeral 46 and consists of a right circular cylindrical central portion 47 and a pair of outwardly flaring portions designated by the same reference numeral 50 extending from opposite ends thereof; and, the purpose of the outwardly flaring portions of each opening 46 will be explained subsequently.

As previously mentioned, the holding means 30 is readily attachable and detachable and such holding means 30 comprises a flexible shaft 51, (FIGS. 9 and 11) preferably made of a strength metallic material. The shaft 51 has torsional capabilities both clockwise and counterclockwise and has one terminal end 52 thereof suitably fixed to a collar 53 which is in turn embedded in the nose member 22. The collar 53 has an annular shoulder 54 extending outwardly from its main body which assures that once the collar is embedded in member 22 it is practically impossible to pull the collar out of such member. The collar 53 also has a tooth-like portion 56 which assures that the collar 53 may be embedded in position and such collar and shaft 51 securely held against rotation relative to the mandrel nose 22.

The flexible shaft 51 extends along the arcuate path or curve 26 defined by the cooperating interlocking members 21–25 and as seen in FIGS. 9 and 11 the outside diameter of shaft 51 is such that there is a generous clearance between such shaft and the members 21 and 23–25.

Accordingly, it is seen that this diameter is substantially smaller than the diameter of the central portion 47 of each central passage 46 to assure movement of the shaft 51 relative to the members 21 and 23–25 in a non-binding manner. In addition, each outwardly flared portion 50 of each passage 46 assures that there will be no binding in the adjoining faces of the various members.

The flexible shaft 51 has external threads 57 provided in its free end portion and the shaft 51 terminates in a terminal end 58 having the shape of rectangular parallelepiped; and, such threads cooperate with another component 59 (FIGS. 9 and 11) which comprises the holding means 30. The component 59 is a disc-like member which is fixed to the plate 40 as by welding and has internal threads 60 therein. The threads 57 and 60 of members 51 and 59 respectively comprise the holding means 30 and enable quick and easy attachment and detachment of such holding means.

The base member 21 of the mandrel 20 has an annular groove 61 defined therein and such groove is of substantially U-shaped cross-sectional configuration. The groove 61 is particularly adapted to receive an inner end of the uncured hose H therewithin to hold such inner end in position during curing.

Figure 2:
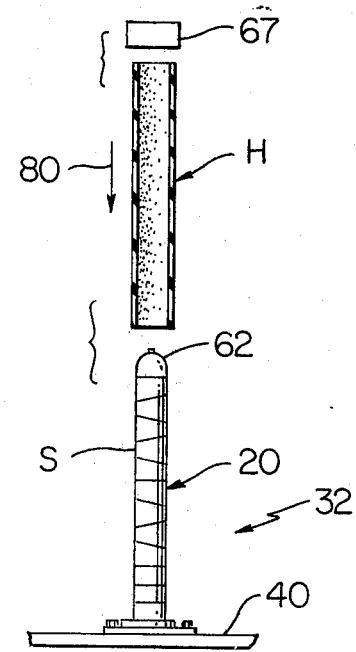
Figure 3:
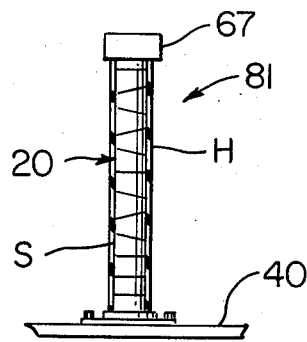

The mandrel nose member 22 has a substantially hemispherical or bullet nosed end 62 to facilitate installation of an uncured sleeve over the mandrel in the manner illustrated in FIG. 2. The nose member 22 also has a central cavity 64 provided therein with an integral threaded member 65 extending centrally outwardly from the base of the cavity 64; and, the member 65 is utilized in a manner to be subsequently described.

The mandrel 20 also has an end cap 67 which is utilized for the dual purpose of tightening the holding means 30 and providing support for the terminal outer end of the hose H. The end cap 67 has a stepped surface 70 of L-shaped cross-section which cooperates with an inner cylindrical surface portion 71 of the nose member 22 to define an annular groove 72 which is substantially identical to the annular groove 61 in the base member 21. The groove 72 receives the outer end of the hose H therewithin so that cap 67 provides the abovementioned support and in a similar manner as the inner end of hose H is received in the groove 61 and base member 21 provides support for the inner end of the hose. The cap 67 has a special cavity 74 therein for receiving the hemispherical end 62 of member 22 and has a central projection 75 provided with internal threads 76 which are adapted to be threadadly engaged with the externally threaded member 65.

Having described the detailed components of the mandrel 20, the description will now proceed with the steps utilized in curing a straight length of uncured polymeric hose to define a permanent curved configuration in same and, in essence, define the cured hose H shown in FIGS. 1 and 11. Accordingly, the base member 21 is fastened on plate 40 in the manner illustrated in FIG. 9 utilizing threaded fastening bolts 41. The second through twelfth members are then suitably installed in position in their previously described positions and each sequentially rotated counterclockwise as it is installed until its projection 36 engages an end wall 77 of an associated recess 37 therebeneath. The first through twelfth members are thus disposed in a vertical cylindrical column with the passages 46 defining a continuous vertical passage therethrough. The nose member 22 is then disposed in position with the shaft 51 extending through such vertical passage and in the process of this disposal threads 57 are threaded within threads 60 and the mandrel is in the position shown at 32 in FIG. 2.

A straight length of uncured polymeric hose H is then disposed in aligned relation over the mandrel as shown in FIG. 2 and in axially telescoped over the mandrel as indicated by the arrow 80. The uncured hose H is shown completely telescoped in position at 81 in FIG. 3 whereupon the end cap 67 is threaded in position.

Figure 4:
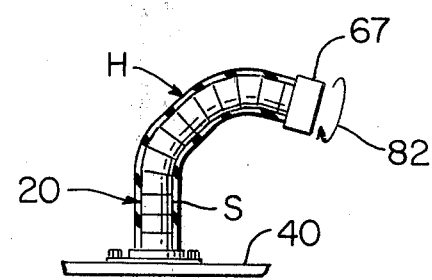

The members of the mandrel are relatively moved and in this example are relatively rotated clockwise as shown by the arrow 82 in FIG. 4 whereupon the interlocking means 27 comprising cooperating recesses 37 and projections 36 are so constructed and arranged that the mandrel members 21–25 interlock in only one position defining the configuration of the mandrel, illustrated in FIGS. 4 and 11, including the curve means or curve 26 therein.

This interlocking action, produced by relative rotation of members 21–25, is produced during the same step of and thus simultaneously with attaching the holding means 30 in position. The holding means 30 serves to hold the members axially against each other after the interlocking action to prevent all movement thereof relative to each other. The holding action of the holding means is achieved by threads 57 of the flexible shaft 51 being threadedly received in threads 60 of member 59. This threading action is achieved merely by threading the end cap 67 on the nose member 22 and continuing rotation of the cap as shown at 82 in FIG. 4.

Figure 5:
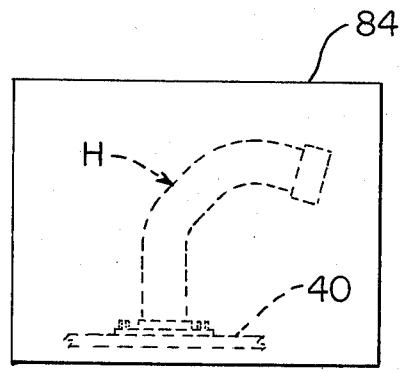

The curved mandrel 20 with the uncured hose H therearound is then suitably cured by placing same in a curing environment shown schematically as a curing chamber 84 in FIG. 5. The hose H and mandrel are subjected to a temperature and pressure for a predetermined time increment based on the composition of the polymeric material comprising the hose H, and as is known in the art.

Figure 6:
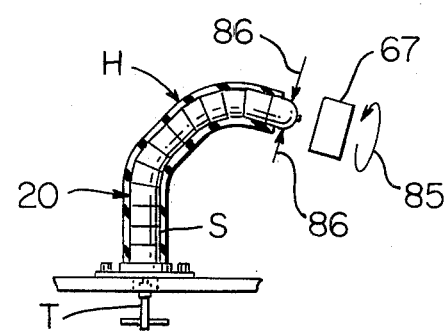

After curing, the mandrel 20 and hose H are removed and suitably cooled whereupon the end cap 67 is removed by rotation thereof counterclockwise as indicated by the arrow 85 in FIG. 6. The mandrel nose member 22 may then be grasped manually or by suitable means indicated by arrows 86, and rotated to unfasten the holding means 30.

The unfastening or detachment of the holding means 30 provides a looseness and axial spacing between the members 21-25. This looseness and axial spacing with the shaft 51 still attached to member 59 enables the hose H in its cured configuration to be readily removed as shown at 33 in FIG. 7. Once this removing action is complete the shaft 51 of the holding means 30 may be further rotated counterclockwise by rotating the nose member 22 as illustrated at 39 in FIG. 8 providing a substantial axial spacing between the mandrel members and simultaneously restoring the members 21-25 to their original positions defining a straight configuration in the mandrel 20 as shown in FIG. 8. This simultaneous restoration is achieved by the interlocking means 27 and in particular by the action of the projections 36 engaging the end walls 77 of the grooves.

In this disclosure of the invention, each end face of each member 21-25 has been described as a planar face with each face 34 having a projection 36 thereon and face 35 having a recess 37 therein; however, it will be appreciated that each face need not necessarily be planar. Further, to faciitate nesting engagement of the mandrel members while assuring minimum likelihood of movement perpendicular the mandrel axis between a pair of adjoining members each member may be provided with suitable nesting means.

Figure 16:
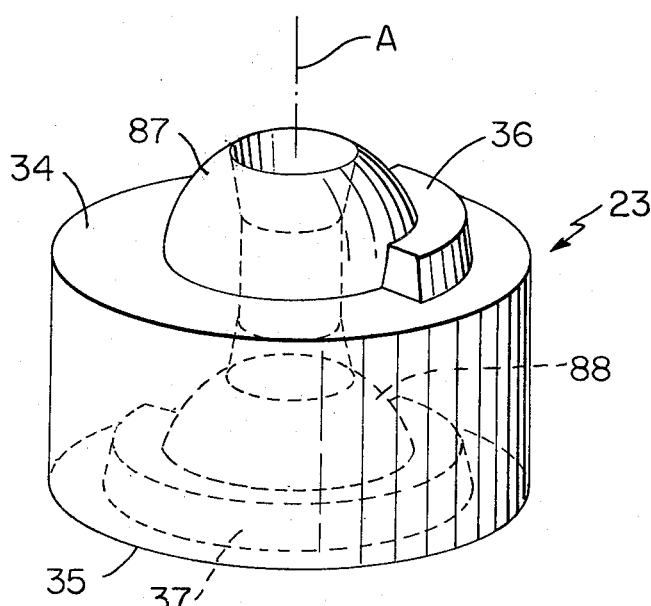
FIG. 16 is a view illustrating a modification of the mandrel member of FIG. 13.

Typical nesting means is shown in FIG. 16 for a modified member 23 and consists of an outwardly convex nesting surface 87 associated with its end face 34 and an inwardly concave surface 88 associated with end face 35. The surfaces 87 and 88 are preferably substantially hemispherical surfaces and it will be appreciated that such surfaces allow nesting of each adjoining pair of members with minimum movement transverse the central longitudinal axis of the mandrel as the mandrel 20 is formed into its curved or contoured configuration. The other surfaces or component portions of the member 23 have been given the same reference numerals in FIG. 16 as in FIG. 13 without discussion thereof. Further, it will be appreciated that each member 24 and 25 would also be provided with nesting surfaces comprised of an outwardly convex hemispherical surface 87 extending from end face 34 thereof and inwardly concave hemispherical surface 88 depending inwardly from face 35 thereof. In addition the base member 21 would also be provided with a concave hemispherical surface 88 and nose member 22 would be provided with a convex hemispherical surface. The members 21-25 with their hemispherical surfaces would be assembled and used with other mandrel components essentially as described above.

The mandrel members 21-25 with interlocking means 27 and holding means 30 are adapted to, provide a substantially straight mandrel for easy installation of an uncured straight hose therearound, define the configuration in the mandrel 20 (including the curve 36 therein) and the same configuration in the uncured hose, and (after curing) provide looseness and axial spacing of the members 21-25 to enable easy withdrawal of the cured curved hose from around the members without damage to such hose or mandrel. By providing the looseness and axial spacing between the mandrel members it is possible to effectively reduce the tendency for the hose H to bind on the curved mandrel as it is pulled away.

The mandrel members 21-25 may be made of any suitable metallic or nonmetallic material. However, preferably such members are made of suitable synthetic plastic material. The plastic material has anti-friction properties enabling easy installation of the uncured hose in position for curing and after curing enabling easy removal of the cured curved hose. The mandrel members 21-25, plate 40, holding means 30, cap 67, and all associated components are such that they can withstand the curing temperatures and may be used repeatedly to produce the curved hose H in mass production quantities. In those applications where the members 21-25 are made of suitable metallic material the hose engaging outside surfaces thereof may be treated to facilitate easy sliding movement of a hose thereagainst.

The hose H of this example has been shown and described as being curved in one plane; however, it will be appreciated that the concept of this invention is fully applicable to the provision of a curved mandrel made from components similar to components 21-25 and provided with interlocking means 27 which interlock at only one position and holding means 30 holding the members together wherein the members once interlocked and held together define a mandrel having curve means in a plurality of planes, i.e., the hose may have one or more curves extending in a plurality of planes.

In this disclosure of the invention reference has been made to the member 21 being a base member which is fixed to the plate 40 and this reference to a base member is made for convenience and merely to set forth that the member 21 defines the base of the mandrel. It will also be noted that the other members 22-25 have been described as being installed outwardly of the base member 21 and this reference to outwardly is merely to describe the position of these members relative to base member 21.

The initial detachment or unfastening of the holding means 30 may be aided utilizing a T-shaped tool T as shown in FIG. 6. The tool T has a socket-like terminal end which is adapted to be disposed around the projection 58 of shaft 51 to facilitate rotation of such shaft relative to the member 59.

While present exemplary embodiments of this invention, and methods of practicing the same, have been illustrated and described, it will be recognized that this invention may be otherwise variously embodied and practiced within the scope of the following claims.

What is claimed is:

1. A mandrel for supporting an uncured polymeric hose during curing to define a curved configuration in the resulting cured hose comprising:
   (a) a plurality of cylindrical members disposed in end-to-end relation, each of said members having opposed end faces, said members comprising a first type having end faces disposed in parallel relation and a second type having end faces disposed in non-parallel relation;
   (b) means interlocking said members;
   (c) readily attachable and detachable holding means for holding said members axially against each other;

said members with said interlocking means and said holding means being adapted to provide a substantially straight position of said mandrel for easy installation of an uncured straight hose therearound; to provide a predetermined curved configuration position of said mandrel for curing said hose and to provide looseness and axial spacing between said members to enable easy withdrawal of the resulting cured curved hose from around said members.

2. A mandrel as set forth in claim 1 in which said interlocking means comprises a cooperating recess and projection in adjoining faces of each adjoining pair of cylindrical members.

3. A mandrel as set forth in claim 2 in which the recess and projection of each cooperating pair is disposed with respect to its end face to provide interlocking of its members in said curved configuration position.

4. A mandrel as set forth in claim 3 in which the recess and projection of each cooperating pair extends along its face on a circular arc having a particular radius to facilitate movement of each projection within its associated recess, each adjoining pair of members being relatively rotatable about a central longitudinal axis of the members, each circular arc of the recess of each cooperating recess and projection having an end wall which defines a stop which determines said curved configuration position for its members.

5. A mandrel as set forth in claim 1 in which each of said cylindrical members has a central longitudinal axis and said parallel end faces of said first type are disposed perpendicular to said axis.

6. A mandrel as set forth in claim 5 in which at least one of said cylindrical members of said second type has said non-parallel end faces defined by one end face disposed perpendicular to its central longitudinal axis and the other end face disposed at an angle other than 90° to its central longitudinal axis.

7. A mandrel as set forth in claim 6 in which at least one of said cylindrical members of said second type has said non-parallel end faces defined by both of its end faces disposed at an angle other than 90° to its longitudinal axis.

8. A mandrel as set forth in claim 1 in which said members also comprise a base member and a nose member, said base member being adapted to be supported on a support plate and said nose member having a substantially bullet nosed terminal end enabling easy insertion of said nose member and remaining members of said mandrel through an uncured hose.

9. A mandrel as set forth in claim 8 in which each of said base member and said cylindrical members has a central opening extending therethrough and said holding means comprises, a support plate, a flexible rod-like member fixed at one end to said nose member and extending through said aligned openings, and means on said support plate adapted to have the terminal outer end of said flexible member fixed thereto.

10. A mandrel as set forth in claim 9 in which said flexible metal member has a threaded outer end and said means on said support plate comprises a member fixed to said support plate having an internally threaded opening therethrough, said member on said base plate being adapted to receive said threaded outer end of said flexible member in threaded engagement through its internally threaded opening.

11. A mandrel as set forth in claim 10 in which said threaded outer end of said flexible member has a key-like extension extending outwardly of its threaded outer end which is particularly adapted to be engaged by a special tool to facilitate final threading and initial unthreading thereof.

12. A mandrel as set forth in claim 11 in which each of said central openings in each of said members has a cylindrical central portion and a pair of outwardly flared portions adjoining opposite ends of the central portion, said flaring portions assuring said flexible member may be fastened in position in a non-binding manner.

13. A mandrel as set forth in claim 9 in which each of said base member and nose member has groove defining means therein adapted to receive an associated terminal end portion of an uncured hose therewithin for curing purposes.

14. A mandrel as set forth in claim 8 in which each of said members is made of a hard synthetic plastic material and said flexible member is made of a metallic material capable of withstanding comparatively high torsional loads in opposed directions.

15. A mandrel as set forth in claim 1 and further comprising nesting surfaces comprising each of said cylindrical members, said nesting surfaces assuring said cylindrical members are more easily disposed in interlocked relation.

* * * * *